US012600390B2

(12) United States Patent
Edmonds et al.

(10) Patent No.: US 12,600,390 B2
(45) Date of Patent: Apr. 14, 2026

(54) RAILYARD TRAIN DETECTION AND EARLY WARNING SYSTEM

(71) Applicant: Miller Felpax Corporation, Winona, MN (US)

(72) Inventors: Matthew Edmonds, Holley, NY (US); Kevin Smith, Ponte Vedra Beach, FL (US); Adam Woyczik, Winona, MN (US); Muhammad Mohsin Naseer, Lahore (PK); Mukhtiar Ahmad, Lahore (PK); Haider Ali, Lahore (PK)

(73) Assignee: MILLER FELPAX CORPORATION, Winona, MN (US)

( * ) Notice: Subject to any disclaimer, the term of this patent is extended or adjusted under 35 U.S.C. 154(b) by 949 days.

(21) Appl. No.: 17/857,659

(22) Filed: Jul. 5, 2022

(65) Prior Publication Data

US 2023/0045300 A1 Feb. 9, 2023

Related U.S. Application Data

(60) Provisional application No. 63/203,873, filed on Aug. 3, 2021.

(51) Int. Cl.
B61L 23/06 (2006.01)
B61L 23/00 (2006.01)
(Continued)

(52) U.S. Cl.
CPC .............. B61L 23/06 (2013.01); B61L 23/00 (2013.01); B61L 25/023 (2013.01); B61L 27/70 (2022.01);
(Continued)

(58) Field of Classification Search
CPC ...... B61L 23/06; B61L 15/0027; B61L 27/70; B61L 23/00
See application file for complete search history.

(56) References Cited

U.S. PATENT DOCUMENTS 3,892,377 A 7/1975 Hathaway
6,113,037 A * 9/2000 Pace ....................... B61L 29/24
246/477
(Continued)

FOREIGN PATENT DOCUMENTS

EP 1308366 A1 5/2003
EP 2821312 A1 1/2015

OTHER PUBLICATIONS

International Search Report dated Nov. 3, 2022 relating to PCT Application No. PCT/US2022/036627, 4 pages.
(Continued)

*Primary Examiner* — Zachary L Kuhfuss
(74) *Attorney, Agent, or Firm* — Stinson LLP

(57) ABSTRACT

The train detection system comprises a wireless communication network further comprising train detection modules attached to catenary poles at the entrance and exit of the railyard. Each train detection module is equipped with a plurality of diverse sensors configured to detect trains and other on-track vehicles. The diverse sensors are simultaneously active and work together for detecting an approaching or leaving train. The train detection modules generate train alerts which are transmitted wirelessly over the wireless communication network. Each of the railyard workers wears a personal alert device capable of wirelessly connecting with the train detection modules and receiving the train alerts over the said wireless communication network. The train alert modules are capable of transmitting alerts wirelessly to personal alert devices and other train alert modules. Train alert modules are capable of generating audio visual warnings for any personnel which may not be equipped with personal alert module.

20 Claims, 7 Drawing Sheets

(51) Int. Cl.

| | |
|---|---|
| *B61L 25/02* | (2006.01) |
| *B61L 27/70* | (2022.01) |
| *G08B 7/06* | (2006.01) |
| *G08B 21/02* | (2006.01) |
| *G08B 25/01* | (2006.01) |
| *G08B 25/10* | (2006.01) |
| *H04W 4/80* | (2018.01) |
| *H04W 4/90* | (2018.01) |
| *H04W 84/18* | (2009.01) |
| *B61L 17/00* | (2006.01) |

(52) U.S. Cl.
CPC .............. *G08B 7/06* (2013.01); *G08B 21/02* (2013.01); *G08B 25/016* (2013.01); *G08B 25/10* (2013.01); *H04W 4/80* (2018.02); *H04W 4/90* (2018.02); *H04W 84/18* (2013.01); *B61L 17/00* (2013.01)

(56) References Cited

U.S. PATENT DOCUMENTS

| | | | |
|---|---|---|---|
| 6,829,536 | B2 | 12/2004 | Oguma et al. |
| 6,848,658 | B2 | 2/2005 | McAllister |
| 7,200,470 | B2 | 4/2007 | Oguma et al. |
| 7,624,952 | B1 | 12/2009 | Bartek |
| 8,109,474 | B2 | 2/2012 | Bartek |
| 8,344,877 | B2 | 1/2013 | Sheardown et al. |
| 8,752,797 | B2 | 6/2014 | Carlson et al. |
| 8,786,428 | B2 | 7/2014 | Sheardown et al. |
| 8,812,227 | B2 | 8/2014 | Carlson et al. |
| 9,227,642 | B2 | 1/2016 | Huntimer et al. |
| 9,381,927 | B2 | 7/2016 | Dimmer et al. |
| 9,542,852 | B2 | 1/2017 | Cross et al. |
| 10,179,595 | B2 | 1/2019 | Carlson et al. |
| 10,518,792 | B2 * | 12/2019 | Denny .................... B61L 27/70 |
| 10,752,272 | B2 | 8/2020 | Bartek et al. |
| RE48,307 | E | 11/2020 | Lingvall et al. |
| 10,889,310 | B2 | 1/2021 | Bailey |
| 10,896,589 | B2 | 1/2021 | Carlson |
| 10,913,472 | B2 | 2/2021 | Bartek |
| 10,926,783 | B2 | 2/2021 | Carlson et al. |
| 2011/0006912 | A1 * | 1/2011 | Sheardown ............. B61L 27/70 340/815.45 |
| 2011/0278401 | A1 * | 11/2011 | Sheardown ............. B61L 23/06 246/167 A |
| 2014/0104081 | A1 | 4/2014 | Cross et al. |
| 2016/0272228 | A1 * | 9/2016 | LeFebvre ................ H04L 67/12 |
| 2016/0280240 | A1 | 9/2016 | Carlson et al. |
| 2017/0088046 | A1 | 3/2017 | Denny et al. |
| 2017/0282944 | A1 | 10/2017 | Carlson et al. |
| 2017/0320507 | A1 | 11/2017 | Denny et al. |
| 2018/0093687 | A1 | 4/2018 | Bartek et al. |
| 2019/0126956 | A1 | 5/2019 | Roberts et al. |
| 2019/0300033 | A1 | 10/2019 | Carlson et al. |
| 2020/0062286 | A1 | 2/2020 | Carlson et al. |
| 2020/0162945 | A1 | 5/2020 | Dan et al. |
| 2020/0317241 | A1 | 10/2020 | Carlson |
| 2021/0001903 | A1 * | 1/2021 | Hilleary .................. B61L 27/70 |
| 2021/0114638 | A1 * | 4/2021 | Cross ..................... B61L 23/06 |

OTHER PUBLICATIONS

Written Opinion dated Nov. 3, 2022 relating to PCT Application No. PCT/US2022/036627, 7 pages.

Extended European Search Report dated May 20, 2025, Application No. 22853677.7-1201 / 430841 PCT/US2022036627, 11 pages.

* cited by examiner

| Scenario | TDM based Detection | | Last Direction RADAR | Last Direction LIDAR | Train Direction (Majority Rule) | Train Alert |
| | First Detection | Second Detection | | | | |
|---|---|---|---|---|---|---|
| A | TDM 1 | TDM 2 | West Bound | West Bound | West Bound | Yes |
| B | TDM 2 | TDM 1 | East Bound | East Bound | East Bound | No |
| C | TDM 1 | TDM 1 | East Bound | East Bound | East Bound | No |
| D | TDM 2 | TDM 2 | West Bound | West Bound | West Bound | Yes |

RAILYARD TRAIN DETECTION AND EARLY WARNING SYSTEM

CROSS-REFERENCE TO RELATED APPLICATION

This application claims the benefit of U.S. Provisional Patent Application No. 63/203,873 filed on Aug. 3, 2021, the contents of which are incorporated by reference in their entirety for all purposes.

BACKGROUND

The present disclosure generally relates to train yard safety systems.

Railyards are facilities co-located next to railroad mainline tracks for the purpose of sorting rail cargo and building full consist trains so that they can be shipped to their proper destinations. While railyards are often operated by the railroads that own them, manufacturers and suppliers that ship large quantities of product via rail often co-locate their own independent railyards adjacent to railroad yards or mainline tracks so that goods can be directly loaded onto railcars at the facility, and can quickly and efficiently ship goods via rail to their customers. Within these independent railyards that are owned and operated by the supplier, and not by the railroad, empty rail cars are often dropped off to be loaded and loaded rail cars are picked up by the railroad to move them to their final destination or to another railyard switching facility operated by the railroad. Often times, the railroads will shove empty cars into the facility or pick up loaded cars from the facility without warning to facility workers working near the tracks. Due to this, near misses and accidents often happen during the drop off and retrieval process between the railroads and independent railyard operators.

A typical railyard consists of multiple railroad tracks that deal with both passenger and goods railroad traffic. The key functions performed in a railyard include receipt and dispatch of trains in addition to storing, sorting, and switching. The safe operation of transit and freight rail services requires periodic inspection and maintenance of railroad tracks and other railway equipment, such as railcars and locomotives. The yard workers may be at risk from approaching trains and other maintenance vehicles as they work on the tracks in a railyard. The railyard workers are particularly at risk for accidents if they are not adequately warned of the approaching trains while working on and around the railroad tracks. Protecting railyard workers from the railroad vehicles inside the yard is a challenging task because the workers might be unable to notice a new railroad vehicle entering the railyard due the noise generated by the existing railroad traffic in the yard and the nature of the work performed inside the yard.

A key objective of this invention is to promptly inform the railyard workers about any vehicles entering the railyard through haptic and audio visual feedback from a personal alert device and train alert modules. Care must be taken so that the trains leaving the yard do not generate any alarms since they are not a threat to the safety of railyard workers.

The railyard workers are currently protected by a blue flag placed on one or both ends of the track where they perform the maintenance tasks and railroad operators are instructed to avoid the portion of the track protected by a blue flag. However, in case the operator does not observe the blue flag, then lining away, switch locking, or derailment is used to provide safety to the railyard workers. A railyard worker, accidentally or unknowingly present outside the protected work area may be at risk if not sufficiently warned of the approaching train. In such situations, an early warning system can potentially save the life of the railyard worker.

The present invention generally relates to the safety of railyard workers performing duties inside a railyard. The system consists of a reliable wireless communication network between train detection modules, train alert modules, and personal alert devices. In another aspect, the present invention relates to the railyard workers' warning system and warning methods with the help of a distributed wireless communication network between the railyard workers, train alert modules, and train detection modules.

SUMMARY

The present invention provides a reliable and efficient method to protect railyard workers by detecting the trains entering or leaving the railyard and providing a timely warning to the railyard workers through voice, visual, and/or haptic means on their personal alert devices. The proposed system is based on redundant and diverse sensors for reliable train detection and alert transmission on a low latency wireless communication network.

The proposed solution generally relates to protecting railyard workers by detecting an approaching train and other railway vehicles and providing early alerts to the railyard workers. The system consists of wirelessly connected train detection modules, train alert modules, and personal alert devices and is capable of detecting railway vehicles entering or leaving the railyard and communicating train alerts to train alert modules and personal alert devices over an ad hoc wireless network.

It is an objective of the present invention that multiple train detection modules should be placed at the outer boundaries of a railyard.

It is a further objective of the present invention to perform train detection with multiple redundant sensors that are active simultaneously and promptly report the detection of train and other maintenance vehicles.

It is an objective of the present invention that multiple train alert modules should be placed with in the railyard premises to provide the wireless coverage of the whole premises.

It is an objective of the train alert module to provide audio visual warnings to the personnel in the railyard.

It is a further objective of the present invention that the train detection and train alert modules form a robust and self-healing wireless communication network.

It is a further objective of the present invention that the train detection modules and personal alert devices communicate over an ad-hoc wireless communication network.

It is a further objective of the present invention that the personal alert devices can receive train alerts from the train detection modules and train alert modules.

It is a further objective of the present invention that redundant wireless communication interfaces and frequency bands are used to reduce the impact of congestion in the ISM wireless communication bands.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
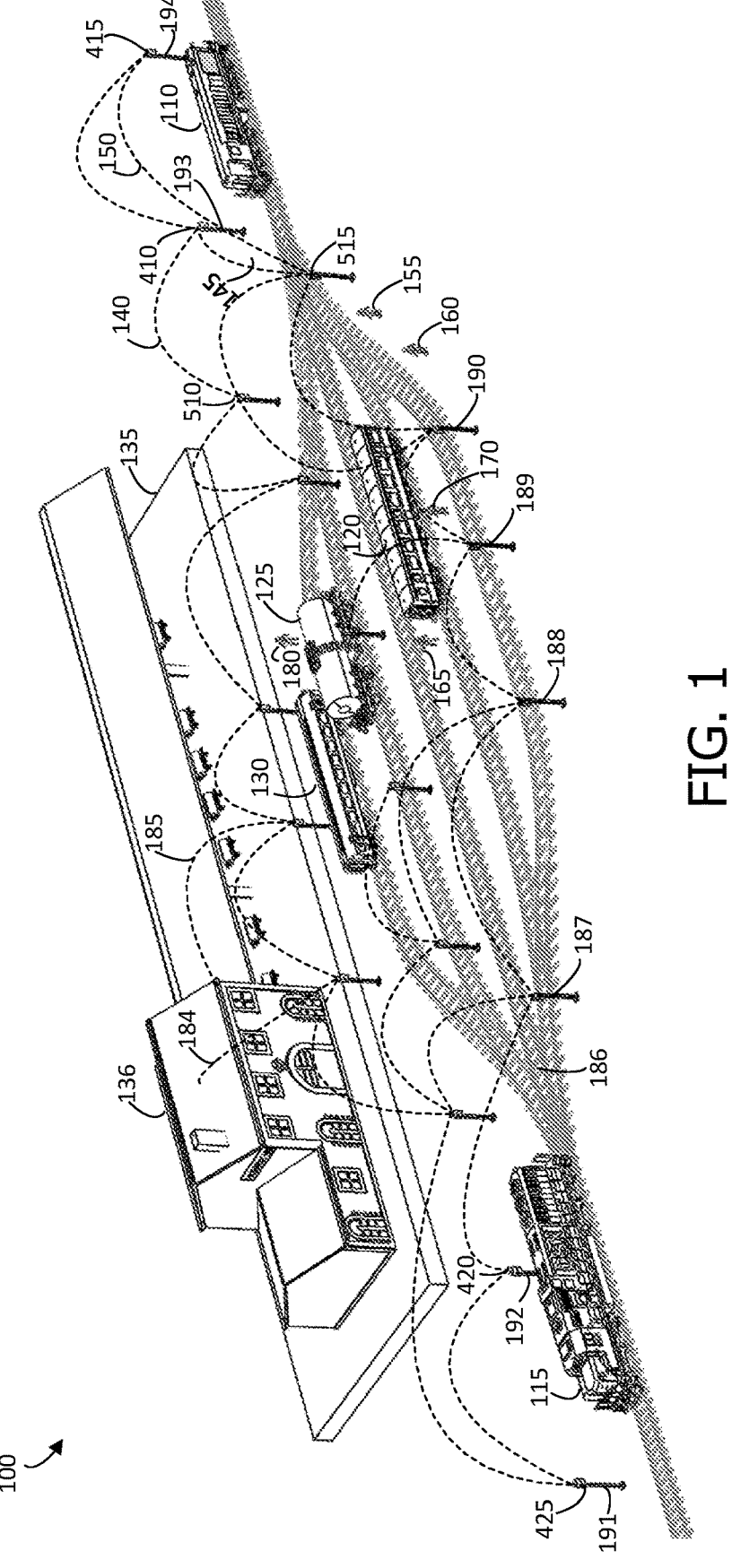
FIG. 1 is a system diagram providing an overview of a railyard equipped with the exemplary railyard worker protection system wherein the system includes a network of train detection modules, train alert modules, and personal alert devices.

Referring to FIG. 1, The embodiments described herein relate to protecting railyard workers by warning railyard workers about oncoming trains. The system comprises a wireless mesh communication network between train detection modules, train alert modules, and personal alert devices wherein the train detection modules are configured to detect vehicles such as a train or other maintenance vehicles on the track and provide an early warning to the railyard workers performing duties inside the railyard.

FIG. 1 is a system diagram showing the railyard 100 equipped with a worker safety system according to a preferred embodiment of the present disclosure. The exemplary railyard 100 comprises a network of railway tracks 186, platform 135, and various poles such as 187, 188, 189, and 190. To detect every train entering and leaving the railyard 100, a plurality of train detection modules 410, 415, 420, 425 are installed at the outer boundaries of the railyard 100. In this exemplary embodiment, two train detection modules 420, 425 are installed on one side of the protected work area of railyard 100 and two train detection modules 410, 415 are installed on the other side of the protected work area of railyard 100. The train detection modules 410, 415, 420, 425 are installed at enough distance from the railyard protected area to give sufficient advance warning to railyard workers before a train enters the protected area. In this exemplary system, train detection modules 410, 415, 420, 425 are attached permanently to the poles, however, other temporary or permanent structures may also be used.

The embodiments described here provide a reliable method to detect an approaching train and alert the railyard workers through visual, audio, and/or haptic feedback. Train detection is based on diverse and redundant sensors that may simultaneously detect an approaching train or any other on-track vehicle in real-time. The train detection sensors of modules 410, 415, 420, 425 include, but not limited to, light detection and ranging based sensor (LiDAR), frequency modulated continuous wave RADAR, vision sensor, inertial measurement units (IMUS), and laser range finder. A custom deep neural network (DNN) based model may be trained on input from all or a subset of sensors' data to detect trains or any other on-track vehicles.

In addition to the installation of redundant train detection modules at the outer boundaries of the railyard 100, various train alert modules, such as module 510 and module 515, are installed inside the railyard 100. Each train alert module 510, 515 is a scaled-down version of a train detection module, which does not include any train detection sensors. The responsibility of train alert modules 510, 515 includes formation of a wireless mesh network with the train detection modules 410, 415, 420, 425 and providing the nearest point of attachment (POA) to the railyard workers performing duties inside the railyard 100. Each train alert module 510, 515 is also equipped with audio and/or visual indicators, such as a siren and strobe light, to warn the railyard personnel not equipped with a personal alert device. Each pole inside the railyard, except poles 191, 192, 193, 194 in the illustrated embodiment, is equipped with a train alert module 510 or 515. However, various other configurations can also be used for the placement of train alert modules depending upon the network coverage requirements of a specific railyard.

As described above, the train detection event, which could be a potential threat for railyard workers, is communicated to the railyard workers through a mesh wireless communication network between the train detection modules 410, 415, 420, 425, train alert modules 510, 515, and personal alert devices. The mesh wireless communication network uses redundant links and radios for reliable and low latency communication. Wireless communication is based on redundant radios to avoid communication loss and delays due to congestion in industrial scientific and medical (ISM) bands. To increase the reliability and reduce delays, wireless communication can also take place in licensed spectrum through ultra-reliable and low latency communication (URLLC) service including 5G and future generations of cellular networks. The ultra-reliable and low latency-based wireless communication ensures timely delivery of critical warnings to the railyard worker through the personal alert device. The system and methods described herein include various configurations, and as a result, the description and figures should be understood as exemplary.

The exemplary embodiment of FIG. 1 shows three trains 130, 125, 120 on different tracks inside railyard 100. Furthermore, various railyard workers 165, 180, 170, 160, 155 are performing duties at different locations inside the protected work area. In an embodiment, every railyard worker is equipped with a personal alert device to receive critical safety alerts. The railyard workers 165, 180, 170, 160, 155 establish an ad-hoc wireless connection with the nearest train detection/alert module. For instance, it is expected that worker 155 will connect wirelessly to the train alert module 515, however, in exceptional cases when line-of-sight communication is not possible with module 515, worker 155 can also connect to train alert module 510 and train detection module 410. When a worker moves outside the range of a train detection/alert module, handoff is made to the train detection/alert module having higher signal strength than the present one.

A train 110 is shown to be entering railyard 100 (from right to left in FIG. 1). The train 110 in the illustrated example will first be detected by train detector module 415 and then train detector module 410. When train 110 reaches pole 193, for example, two train detection modules 415, 410 detect it and determine its direction of travel to be entering the railyard 100. A safety alert is issued to all the railyard workers through the wireless mesh communication network. The train alert modules 510, 515 receive the safety alert issued by train detection module 410 through wireless communication link 140, 145, respectively. The train detection module 415 likewise receives the safety alert issued by train detection module 410 through wireless communication link 150. The redundant communication paths ensure timely delivery of the critical safety alerts to the railyard workers. Every railyard worker may receive the safety alerts from multiple train detection/alert modules and will discard the duplicate alerts. In addition, the information about train 110 entering the railyard 100 is also communicated to the railyard administration office 136 through the wireless links 184, 185.

FIG. 1 illustrates another train 115 leaving the railyard 110 (from right to left in FIG. 1). In this instance, train detection module 420 first detects the train 115 and then train detection module 425 detects it. When train 115 reaches pole 191, two train detection modules 425, 420 detect its presence and ascertains the direction to be leaving the railyard 100. No safety alert is issued by the train detection modules 425, 420 to the railyard workers in this case as a leaving train does not pose any threat to the workers inside the railyard 100. However, information about train 115 leaving railyard 100 is communicated to the administration office 136 on the railyard platform 135.

Figure 2:
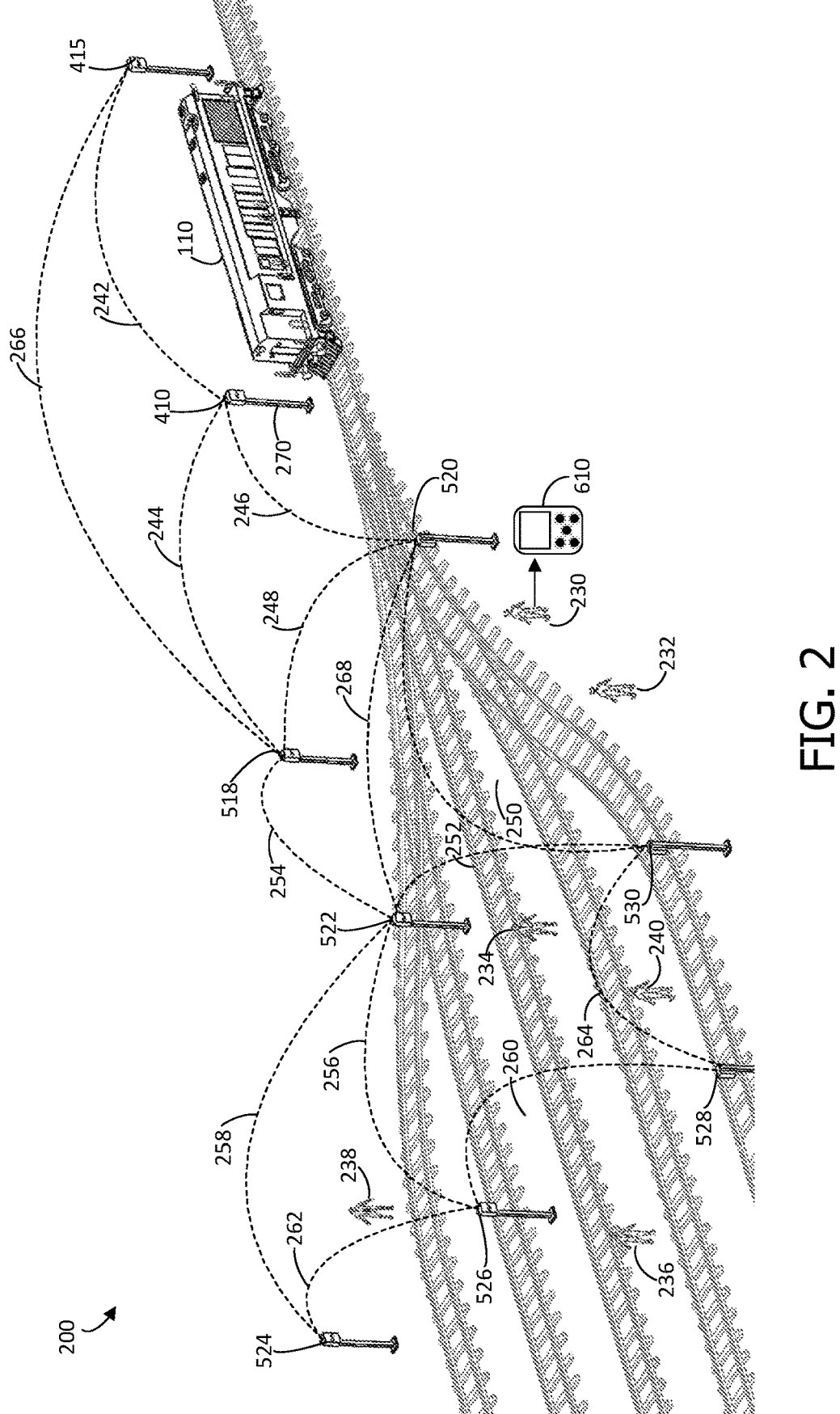
FIG. 2 is a wireless mesh network between the train detection and alert modules installed at suitable locations on-premises of a railyard.

FIG. 2 shows a wireless mesh communication network between train detection modules 410, 415 and train alert modules 518, 520, 522, 524, 526, 528, 530 in a part of a railyard 200. The wireless communication network is configured such that temporary or permanent communication link failures due to congestion or hardware fault in any of the radios does not impact the delivery of safety-critical train alerts. In the illustrated example, multiple workers 236, 238, 240, 234, 232, 230 are in the railyard 200. Each railyard worker, such as 230, is equipped with a personal alert device 610. The exemplary embodiment shows two train detection modules 410, 415 and multiple train alert modules, such as modules 524, 526, 528, 530, 522, 518, 520. The train 110 is shown to be entering the railyard 200. Multiple wireless communication links 262, 260, 264, 256, 258, 252, 250, 254, 268, 248, 246, 244, 266, 242 between the train detection modules 410, 415 and train alert modules 518, 520, 522, 524, 526, 528, 530 together form a wireless mesh communication network to provide fault tolerance. In addition to the redundancy in communication paths, each communication link, such as 246, can be established through more than one radio interface. One communication interface may be using a radio operating at 900 MHz as an exemplary embodiment while the second may be operating at 2.4 GHz or 5 GHz frequency bands. The mentioned communication bands are exemplary, which can be any other available frequency bands in addition to the mentioned ones. The radio technology used may include, but not limited to, XBEE modules, ZigBee, Bluetooth classical, Bluetooth low energy (BLE), Wi-Fi, or based on any other universal software radio peripheral (USRP) software-defined radio (SDR) using a custom software stack.

To illustrate the fault tolerance in the communication network, train 110 is shown to be entering the railyard 200. When the train 110 arrives at pole 270, the train detection module 410 detects its presence and ascertains its direction entering the railyard 200. A railyard worker 230 is shown to be connected with the train alert module 520. The train detector module 410 may try to deliver the train alert to the train alert module 520 through the communication link 246 using primary radio. In case the train detection module 410 is unable to deliver the train alert message to the train alert module 520 after a configurable timeout, it will try to deliver it with a number of available backup radios. In parallel, the train detector module 410 may also try to deliver the train alert to the train alert module 520 on communication links 244 and 248. The train alert module will relay the earliest train alert to worker 230 and discard all the duplicate alerts received through redundant radios and/or communication links.

Figure 3:
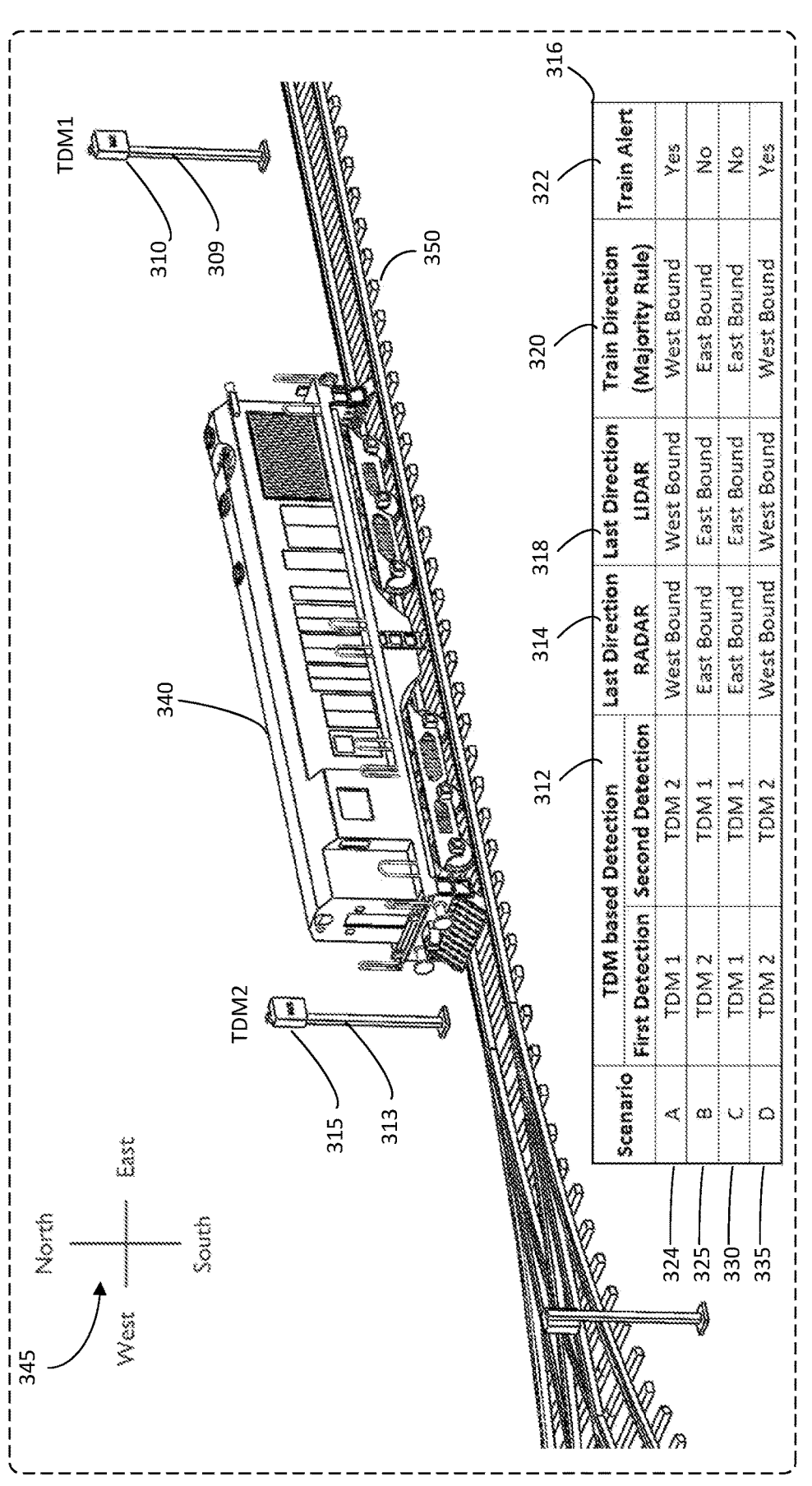
FIG. 3 is a diagram showing how redundant sensors and train detection modules are used to provide safety alerts to the railyard workers.

FIG. 3 presents an exemplary scenario to highlight two important aspects of the present disclosure, which are train detection and train direction determination. Reliable train detection is the key factor in providing a safe working environment for the railyard workers. In addition, accurate determination of train direction is crucial because incorrect train direction decisions may result in false-positive as well as false-negative train alerts.

Two train detection modules, TDM2 315 and TDM1 310 are installed at the outer boundary of a railyard. TDM2 315 is installed on pole 313 and facing towards track 350. Similarly, TDM1 310 is installed on pole 309 and facing toward track 350. Both train detection modules 315, 310 are equipped with diverse and redundant sensors which are simultaneously active to detect trains and other on-track vehicles. Some of the suitable sensors, such as inertial measurement units (IMU), vision sensor, and RADAR detects train 340 before the train reaches the train detection module TDM2 315. Other sensors, such as LiDAR and laser range finder, detect train when it crosses in front of the train detection module TDM2 315. In addition to train detection, the LiDAR and RADAR also report the direction of the train 340 to the train detection module. The exemplary scenario shows train 340 entering a railyard having a west-bound direction, as indicated by compass rose 345. During travel, train 340 will first be detected by TDM1 310 and its direction is determined to be west-bound by both RADAR 314 and LiDAR 318 in the illustrated embodiment. Later on, the train 340 is detected by TDM2 315 and its direction is determined to be west-bound by both RADAR 314 and LiDAR 315. When train 340 arrives at pole 313, it is detected by the two train detection modules, 315 and 310, and its direction is determined by four independent sensors.

Table 316 provides a summary of the train detection and direction determination algorithm. In the exemplary embodiment, where two train detection modules 315 and 310 are used for train detection, two train directions are possible out of four possible scenarios. In Scenario A 324, TDM1 310 followed by TDM2 315 detects train 340, which suggests west-bound train movement. Furthermore, both RADAR 314 and LiDAR 318 report west-bound train movement. It is concluded that a train or any other on-track vehicle is entering the railyard having west-bound direction 320 and the train detection module TDM2 315 generates an alert for the railyard workers.

Scenario B 325 of the table shows that train 340 was first detected by TDM2 315 and then TDM1 310, which suggests east-bound movement. In addition, both RADAR 314 and LiDAR 318 reported east-bound movement of the last detected train. In scenario B 325, the direction reported by the sequence of train detections 312 and by individual sensors 314, 318 suggest the east-bound movement of the train 340. No train alert 322 is issued for the railyard workers in scenario B 325 as a leaving train 340 does not pose any threat to the workers.

Scenario A 325 and B 325 are examples of the straight movement of train 340 without any reversal. Scenario C 330 shows train 340 is first detected by TDM1 310, both RADAR and LiDAR reported west-bound movement, and after some time it is detected again by TDM 1 but both RADAR 314 and LiDAR 318 reported east-bound direction. In this exemplary scenario, train 340 was reversed after crossing TDM1 310 but before reaching TDM2 315. Scenario C 330 of table 316 shows the last direction reported by RADAR 314 and LiDAR 318 is east-bound. The system does not generate any train alert in this scenario as train 314 is heading outside the railyard and no longer poses any threat to the railyard workers.

Scenario D 335 of table 316 shows train 340 is first detected by TDM2 315 and after some time is detected by TDM2 315 again without being reported by TDM1 310. The last direction reported by both RADAR 314 and LiDAR 318 is west-bound. Sequence-based train detection 312 supports the train direction reported by RADAR 315 and LiDAR 318 and the system generates a train alert 322 to the railyard workers accordingly.

Figure 4:
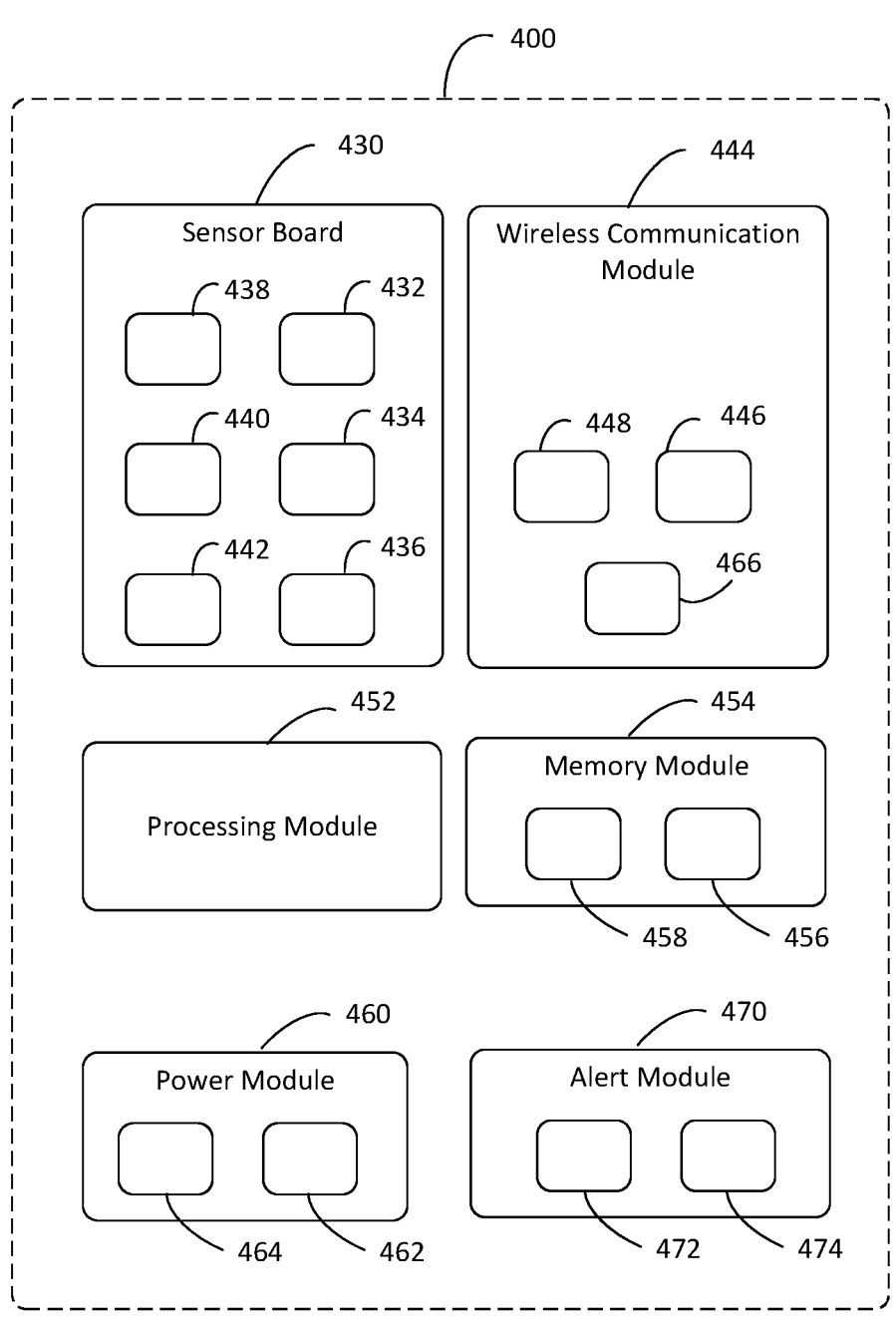
FIG. 4 is a block diagram of various components of the train detection module.

FIG. 4 shows components of a train detection module 400 according to an embodiment. A sensor board 430 on the train detection module 400 includes various sensors to detect trains and other on-track vehicles. The sensor board 430 includes a multi-beam LiDAR 438 module. The LiDAR 438 simultaneously emits beams of infrared pulses and senses the presence, distance, and direction of the train from reflected waves. Another sensor used on the sensor board 430 is a frequency-modulated continuous-wave radar (FM-CW) RADAR 432. The RADAR 432 continuously emits frequency-modulated radio waves and when a train or any other on-track vehicle is in the view-angle of the RADAR 432, a portion of the waves is reflected back. The RADAR 432 processes the reflected waves and may determine the object size, direction, speed, and distance from it. The sensor board 430 also includes a laser range finder 440 which continuously emits a laser beam and detects the presence of a train from a portion of the reflected waves. A vision sensor 434 on the sensor board reports compressed images which are further used to detect the presence of a train or any other on-track vehicle. The vision sensor 434 is accompanied by an infrared transmitter to make it useable in low light conditions. The sensor board 430 also includes an inertial measurement unit (IMU) 442 to detect the presence of a train by sensing the vibration pattern. Furthermore, the IMU 442 is also used to determine the orientation of the train detection module 400 which can change over time or suddenly due to impact by other objects or environmental conditions such as wind or snow. In addition to the above-mentioned sensors, the sensor board 407 may also include a transducer and filter module 436 which converts analog signals to digital format and apply necessary filters on the data generated by raw sensors.

The train detection module 400 of FIG. 4 includes a wireless communication module 444. The wireless communication module 444 may use more than one radio for reliable and low latency communication. In the exemplary embodiment, primary 448 and secondary 446 radios operate in different available ISM bands. Both primary 448 and secondary 446 radios are used to establish and maintain a mesh communication network between the train detection modules, train alert modules, and personal alert devices. An ultra-reliable and low-latency communication (URLLC) based 5G modem 466 may also be used for communication between the train detection module, train alert module, and personal alert devices. A processing module 452 is responsible for the execution of train detection module 400 software which includes functions such as performing startup verification of various sensors and I/O modules, processing signals and data received from various sensors for making decisions, and preparation of data packets to be transmitted to the connected devices through the wireless mesh communication network. The configuration parameters and other diagnostic information for various components available on the train detection module 400 are stored in non-volatile memory 458 present in a memory module 454. A real-time clock RTC 456 is included in the memory module 454 for various time-keeping purposes. The train detection module 400 includes a power module 460 to provide power to various components available on the train detection module 400. The power module 460 includes a battery that provides battery backup to train detection module 400. The exemplary embodiment shows a rechargeable lithium-ion battery 464, however, any other suitable battery to provide backup to train detection components may be used as an alternative. A power supply unit 462 in the power module 460 provides regulated power to all the components of the train detection module 400. The power module 460 also includes a battery monitoring and conditioning system which generates alerts in case the battery is nearing depletion. An alert module 470 on the train detection module 400 comprises an audio alert module 472, which can be a buzzer, and a visual alert module 474, which can be LEDs or an LCD. Alert module 470 may warn the railyard workers about an oncoming train and the train operator about the workers in the protected work area.

Figure 5:
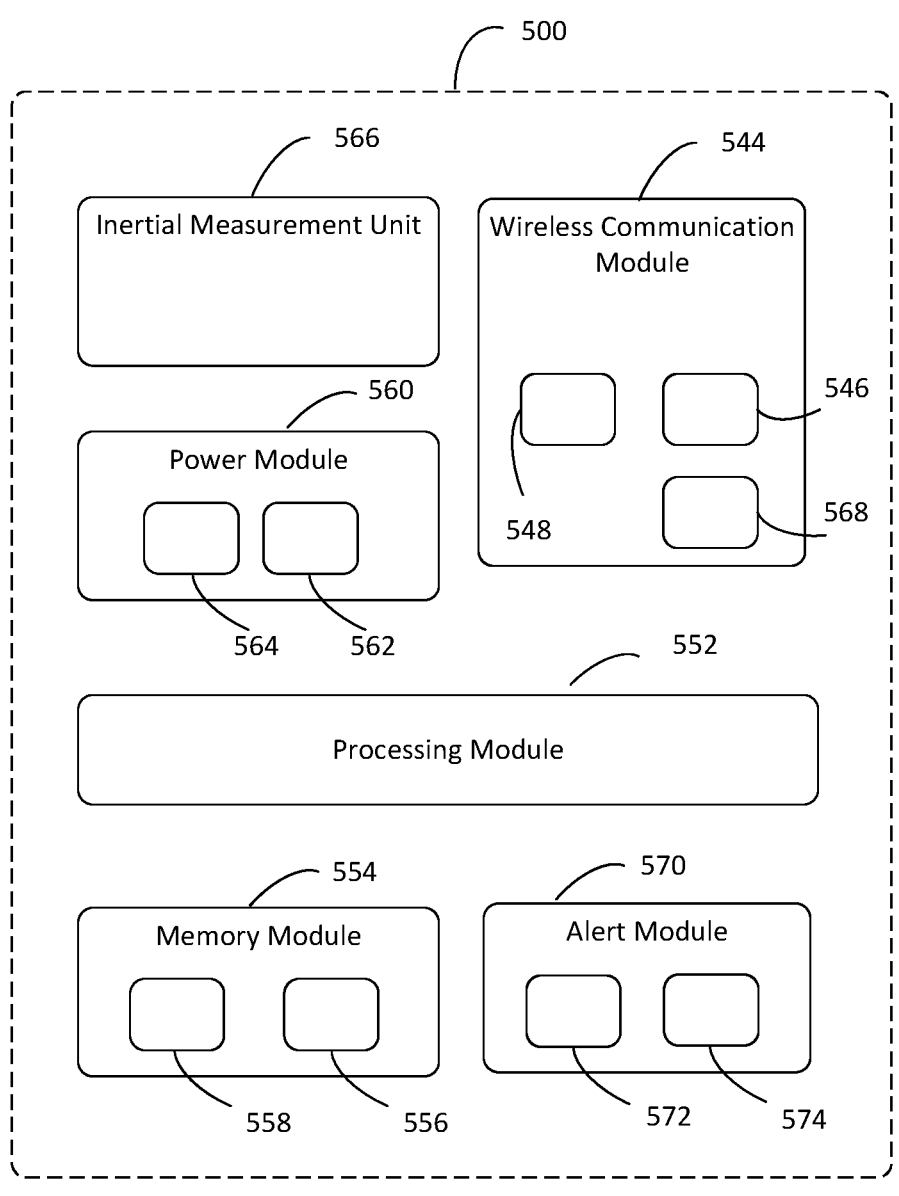
FIG. 5 is a block diagram depicting various components on the train alert module.

FIG. 5 shows components of a train alert module 500 according to an embodiment. An inertial measurement unit (IMU) 566 is used to determine the orientation of the train alert module 500 which may change over time or suddenly due to impact by other objects or environmental conditions such as strong wind or snow storm. A wireless communication module 544 may use one or multiple radios to provide fast and reliable communications. Primary 548 and secondary 546 radios are used to create a mesh communication network between the train detection modules, train alert modules, and personal alert devices. The train alert module 500 may use one or multiple active radios at a time depending upon congestion in the radio channels being used. The ultra-reliable and low-latency communication (URLLC) based 5G modem 568 may also be used for communication between the train detection module, train alert module, and personal alert devices. A power supply unit 564 in the power module 560 provides regulated power to all the available components on the train alert module 500. The power module 560 includes a battery that provides battery backup to the train alert module 500. The exemplary embodiment uses a rechargeable lithium-ion battery 562, however, any other suitable battery can be used as an alternative. The power module 560 also includes a battery monitoring and conditioning system which generates alerts in case the battery is approaching charge depletion. A non-volatile memory 558 in a memory module 554 is used to store various application configuration parameters and system diagnostic events. A real-time clock (RTC) 556 is used for time-keeping purposes such as time-stamping the system diagnostic events. A processing module 552 is responsible for the execution of train alert module 400 software which includes functions such as performing startup verification of various sensors and I/O modules, processing signals and data received from various sensors and modules for making decisions, and preparation of data packets to be transmitted to the connected devices through the wireless mesh communication network. An alert module 570 on the train alert module 500 comprises an audio alert module 572, which can be a buzzer, and a visual alert module 574, which can be LEDs or an LCD. Alert module 570 may warn the railyard workers about an oncoming train and the train operator about the workers in the protected work area.

Figure 6:
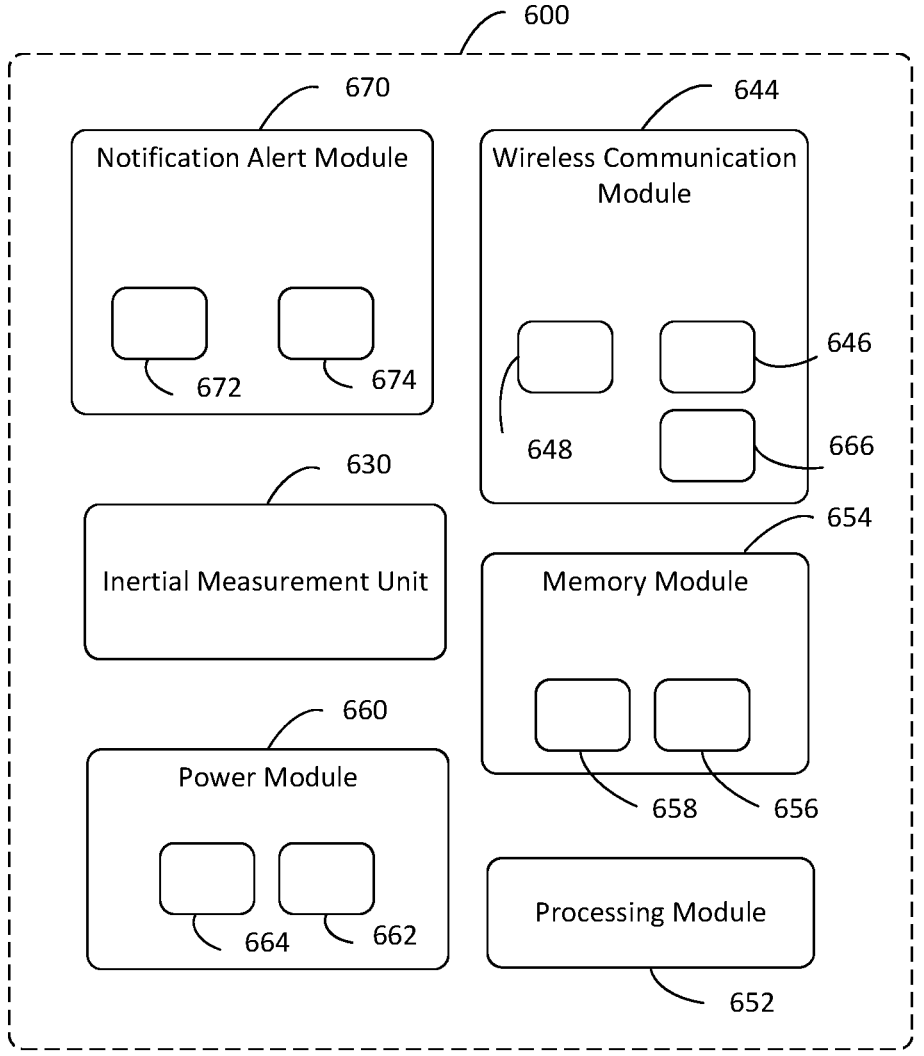
FIG. 6 is a block diagram showing various components of the personal alert device.

FIG. 6 shows components of a personal alert device 600 according to an embodiment. A notification alert module 670 includes at least one audible alert device 672 which can be a buzzer and a visual alert device 674 which is an LCD in the preferred embodiment. A wireless communication module 644 is used to create a wireless mesh network with other devices in the network. The wireless communication module 644 may include one or more radios for reliable and low latency radio communications. The exemplary embodiment shows two radio modules, primary radio 648 and secondary radio 646, which operate in the ISM frequency bands. The personal alert device 600 may use a multiple of active radios at a time depending upon the reported congestion in the radio channels used. The ultra-reliable and low-latency communication (URLLC) based 5G modem 666 may also be used for wireless communication between the train detection modules, train alert modules, and personal alert devices. An inertial measurement unit (IMU) 630 is used to determine the orientation of the personal alert device 600. Furthermore, the IMU 630 may also be used to determine the status of the railyard workers, i.e., walking or static. A non-volatile memory 658 in a memory module 654 is used to store various application configuration parameters and system diagnostic events. A real-time clock (RTC) 656 is used for all time-keeping purposes, i.e., time-stamping the system diagnostic events. A power supply unit 664 in the power module 660 provides regulated power to all the available components on the personal alert device 600. The power module 660 includes a battery that provides battery backup to personal alert device 600. The exemplary embodiment utilizes a rechargeable lithium-ion battery 662, however, any other suitable battery can be used as an alternative. A processing module 652 is responsible for the execution of personal alert device 600 software which may include functions such as performing startup verification of various sensors and I/O modules, processing signals and data received from various modules for making decisions, and preparation of data packets to be transmitted to the connected devices through the wireless mesh communication network.

Figure 7:
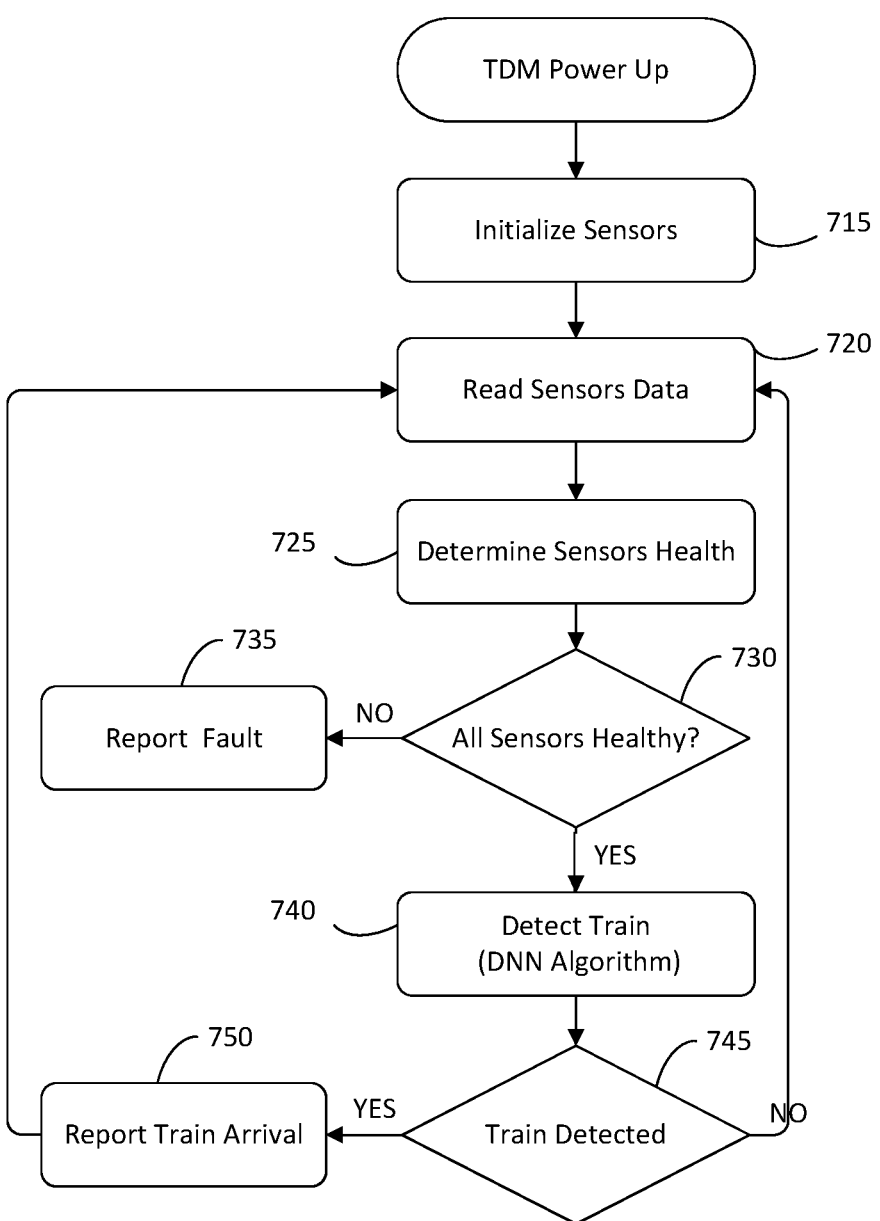
FIG. 7 is a block diagram of the software process on the train detection module to detect trains and monitor the health of sensors.

FIG. 7 is a block diagram showing the software process responsible for train detection and sensor health monitoring on the train detection module. At power-up, the train detection module initializes all the sensors, as indicated by block 715. The initialization includes configuring the sensors to report data at the desired rate, format, and interface. After the successful sensor initialization, the train detection module reads data from all the sensors, as indicated by block 720. Data read from the sensors include train detection data in addition to the individual sensor's health data. In the next step indicated by block 725, the train detection module determines sensor's health by analyzing the data received from the sensors. Block 730 and block 735 indicate if one or more sensors have a problem in their health status and have reported fault. The sensor fault reporting includes logging the event for diagnostic purposes, informing the railyard workers and the worker in-charge about the potential degradation in the accuracy of the train detection algorithm, and reporting this issue to the railyard administration 136 shown in FIG. 1. The train detection algorithm is based on a custom deep neural network (DNN), trained offline which also simultaneously learns from the sensors generated data in the online fashion. The DNN algorithm, as indicated by block 740, considers the sensors' data and provides train detection information with high accuracy in real-time. Block 745 and block 750 indicate the arrival of a new train in the railyard and reporting its arrival to the railyard workers through the wireless mesh communication network.

An early warning generated for railyard workers about an approaching train can reduce the risk of an accident and save the lives of workers. Various systems and methods exist which are designed to provide warnings to roadway workers about an approaching train on the mainline track. Traditional worker safety methods use flaggers located at a predefined distance from the work area. Flaggers are instructed to warn the roadway workers or operators of the approaching trains using flags and whistles.

To enhance the safety of roadway workers, various systems have been developed in the past that detect an approaching train and warn roadway workers. One such system is proposed in U.S. Pat. No. 7,624,952 which makes use of a radio transceiver placed onboard a train. Roadway workers also carry warning devices equipped with a similar radio transceiver. The onboard radio transceiver continuously transmits radio frequency warning signals that are picked up by the worker wearable devices and an alarm is generated on receiving the warning signal. Similarly, the worker wearable devices also transmit radio signals that are received by the onboard radio module to warn the train operator about the presence of the workers nearby. The proposed system cannot be used for workers' safety in a railyard environment as every vehicle may not be equipped with an onboard device.

Another solution proposed in the same patent makes use of the vehicle onboard controls unit (VOBC) available on trains. The VOBC can control brakes, cab displays, and other devices available onboard such as RFID tag readers. The proposed system includes a portable tag powered by an internal battery and placed on the tracks inside a railyard that interacts with the onboard tag reader to send a warning to the train operator. A limitation of this system is that the portable tags can be misplaced inside the railyard which can result in false warnings.

Another system proposed in U.S. Pat. Nos. 8,109,474, and 7,624,952 uses a portable train detector to detect an approaching train. A dual ultrasonic sensor is used as a train detector and is placed adjacent to the rail to detect the train wheel movement. An issue in this system is the limited range of the ultrasonic sensor, which is around 20 inches, and as a result, requires a detection unit to be installed directly on one of the rails by using special clamping means. This makes the installation expensive in terms of time and results in lost revenue. This system is based upon ultrasonic sensors which have a known failure mode of decreased detection distance if there is any water drops on the surface of the emitter or receiver.

One other system, proposed in U.S. Pat. No. 8,344,877 B2, makes use of train mounted RFID tags for communication between detectors and worker devices. The detectors contain transceivers capable of receiving data from worker devices. This data is then relayed to a central information processing center (CIPC). Similarly, information from the equipped train is also relayed to the CIPC either directly or through the wayside detectors. The centralized processing model can become a single point of failure under various working situations thus rendering this invention potentially unsafe to use. Also there is no way of ensuring that a train entering a railyard is equipped with the appropriate equipment thus rendering this system useless for unequipped trains and leaving the workers unprotected.

Another suggested solution is proposed in U.S. Pat. No. 8,786,428 B2. The proposed solution uses station blare units (S-BUs), train blare units (T-BUs), and off-track blare units (O-BUs) employed along the track to detect and warn roadway workers about an approaching train and warn the train operator about a protected work zone. The S-BUs, T-BUs, and O-BUs all contain an RFID tag reader to detect a portable tag carried by roadway workers. The S-BUs are deployed at the start of the track to be protected and allow the roadway worker to enter information such as the size or workgroup. All roadway workers register themselves through RFID tags read by the readers on S-BUs, allowing them to form a protected work zone. All other units are T-BUs where roadway workers register through RFID tags as they move along the track forming a protected work zone wherever the workers move. The roadway workers can also move off the track by registering through O-BUs. Lights and audible alarms are available on all the units to provide warning indications to workers and train operators. All the units have local data processing units (LDPUs) which are used to control the functions of various peripherals available on the units. All LDPUs are connected to a transit control via central data processing (CDP) and network controller. The LDPUs cannot perform any logical calculations and all the units are controlled by the central data processing unit which is also responsible for making decisions. Similar to the previous invention, the centralized processing model can become a single point of failure under various working situations.

One other solution, proposed in U.S. Pat. No. 9,542,852 B2, employs RF transceivers to detect trains approaching a work zone and to warn roadway workers about an oncoming train. The system comprises personal notification units (PNUs) containing RF transceivers that provide train warning notifications to the workers whereas vehicle computer units (VCUs) containing RF transceivers deliver warnings of an approaching work zone to the train operators. The PNUs transmit location-based data to VCUs which in turn send the vehicle location information to the PNUs. Based on the location information, warnings are generated for workers in the form of audible, visual, and vibration alerts whereas VCUs may use positive train control (PTC) to control train brake and speed depending on the changing conditions. The VCU may provide worker locations to the operator through a screen. In addition, repeater units, also known as priority detectors, forward train detection warnings to PNUs, VCUs, and other system devices. A central control server is also a part of the proposed system, which can also receive data from the PNUs and VCUs via priority detectors and process that information to send warning signals to PNUs and VCUs. The main drawback of this system is that the system is dependent on direct RF communications between PNUs and VCUs and any communication failure between the two could result in partial or total system failure. Furthermore, it requires installing the onboard vehicle computer unit and related modules in all the trains.

Another solution disclosed in U.S. Pat. No. 10,518,792 B2 presents reliable detection of train and other railway vehicles to warn the roadway workers about the oncoming trains. This solution is based on train detection modules installed at catenary poles along the mainline track, an onboard device, and handheld devices for roadway workers. The train detectors are based on redundant and diverse sensors. A wireless mesh network is used for communication between the train detectors, onboard devices, and handheld devices for roadway workers. This system is specifically designed for roadway worker's protection outside the railyard. This system is best suited to be used in a long range linear network orientation and may not be best suited for the complex multi path networks formed in the railyard environment.

The systems presented in the prior art are designed to protect roadway workers on the mainline track. Maintenance operations inside the railyard are different in nature from the mainline track. For instance, railyard workers may be performing duties on a specific track while trains operating normally on the nearby tracks which might otherwise trigger an alarm in the prior art systems. The key objective of the current invention is to detect the trains entering or leaving the railyard but warn the workers only when a new train arrives in the yard while not disturbing them when a train leaves the yard. Furthermore, low latency wireless communication can be challenging inside the railyard due to various types of equipment operating in the ISM (industrial, scientific and medical) wireless communication band. Instantaneous or permanent congestion in the wireless communication bands may cause communication delays or even communication outages. This suggests a need for redundant communication interfaces and robust protocols to ensure timely delivery of the warning messages. Train detection may also be challenging in the railyard environment, as compared to the mainline track, due to various types of rail equipment operating in the railyard that may generate false alarms. Furthermore, due to relatively low train speeds in the railyard, some of the sensors, such as motion sensors, may not be very reliable for train detection. In addition to train detection, accurate train direction determination is also important for railyard worker safety systems.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A railyard worker protection system, the system comprising:

a plurality of train detection modules each located at a boundary of a railyard, wherein at least one railway track crosses the boundary, the train detection modules each configured to detect a train in the railyard on the at least one railway track and a direction of travel of the train thereon, the train detection modules each having a plurality of sensors configured to simultaneously detect the train crossing the boundary of the railyard and further configured to generate a detection signal in response to the train crossing the boundary;

a plurality of train alert modules distributed within the railyard, the train alert modules each configured to receive the detection signal when transmitted thereto by one or more of the train detection modules and to generate an alert signal in response thereto;

at least one personal alert device, the personal alert device being portable and configured to be carried by a user, the personal alert device configured to receive the alert signal from one or more of the train alert modules and to generate an alarm in response to the received alert signal to warn the user of the train entering the railway yard; and a wireless mesh communication network, the wireless mesh communication network being configured to wirelessly connect the train detection modules, the train alert modules, and the personal alert device, wherein the train detection modules are configured to transmit the detection signal via the wireless mesh communications network to the plurality of train alert modules in response to the train entering the railyard based on the detected direction of travel, wherein the train detection modules are configured to not transmit the detection signal via the wireless mesh communications network to the plurality of train alert modules in response to the train exiting the railyard based on the detected direction of travel, and wherein the train alert modules are each configured to transmit the detection signal via the wireless mesh communications network to the at least one personal alert device when the personal alert device is in proximity thereto.

2. The system as set forth in claim 1, wherein the train alert modules are configured to follow the connecting railways, and wherein the personal alert device receives the signal from the at least one of the train alert modules when the train entering the railyard diverts onto one of the plurality of connecting railways in proximity with the personal alert device.

3. The system as set forth in claim 1, wherein the wireless mesh communications network is configured to utilize multiple different means of wireless communication to deliver the detection signal such that if a first means of wireless communication fails to communicate the signal, the signal is communicated using a second means of wireless communication.

4. The system as set forth in claim 3, wherein the means of wireless communication comprises at least one of an XBEE module, ZigBee, Bluetooth classical, Bluetooth low energy, Wi-Fi, universal software radio peripheral, software-defined radio, Cellular Data Networks, 900 MHz radio band, 2.4 GHz radio band, or 5 GHz radio band.

5. The system as set forth in claim 1, wherein each of the train detection modules comprises both a range sensor and a proximity sensor to sense the location and direction of the train relative to the train detection module.

6. The system as set forth in claim 5, wherein the range sensor comprises at least one of a vision sensor or a RADAR detector.

7. The system as set forth in claim 5, wherein the proximity sensor comprises at least one of a LIDAR detector or a laser range finder.

8. The system as set forth in claim 5, wherein the first train detection module and the second train detection module each comprises a plurality of train detectors, wherein the first train detection module and the second train detection module are configured to determine the direction of the train by a comparison between the proximity sensors and range sensors of the plurality of train detectors, and wherein the first train detection module and the second train detection module are configured to generate a signal when the direction of the train is into the railyard and not generate a signal when the direction of the train is out of the railyard.

9. The system as set forth in claim 1, wherein each of the train alert modules comprises an alarm system configured to alert the user of the personal alert device of the entry of the train into the railyard.

10. The system as set forth in claim 9, wherein the alarm system includes at least one of a siren or a strobe light.

11. The system as set forth in claim 1, wherein the personal alert device is configured to generate an alarm using at least one of a visual feedback, a haptic feedback, or an audio feedback.

12. The system as set forth in claim 1, wherein the first train detection module and the second train detection module each comprises a plurality of train detectors.

13. A method of monitoring railyard worker protection system, the method comprising:

initializing a plurality of train detection modules each located at a boundary of a railyard, a plurality of train alert modules distributed within the railyard, and a plurality of personal alert modules configured to be carried by railyard workers, the initializing comprising configuring the modules to report data in the desired rate, format, and interface via a wireless mesh communication network;

reading, from one or more of the train detection modules, train alert modules, and personal alert modules, train detection and individual sensor health data, the train detection modules configured to detect a train in the railyard on at least one railway track and a direction of travel of the train thereon, the train detection modules each having a first plurality of sensors configured to simultaneously detect the train crossing the boundary of the railyard and further configured to generate a detection signal in response thereto;

reporting and informing railyard workers and administration of sensor health data via the wireless mesh communication network;

transmitting, by one or more of the train detection modules, the detection signal via the wireless mesh communications network to the plurality of train alert modules in response to the train entering the railyard based on the detected direction of travel for indicating arrival of the train to the railyard in response to detection thereof by one or more of the train detection modules;

not transmitting, by one or more of the train detection modules, the detection signal via the wireless mesh communications network to the plurality of train alert modules in response to the train exiting the railyard based on the detected direction of travel for indicating departure of the train from the railyard in response to detection thereof by one or more of the train detection modules; and transmitting, by one or more of the train alert modules, the detection signal transmitted thereto via the wireless mesh communications network to at least one personal alert module when the at least one personal alert module is in proximity thereto;

reporting, by the at least one personal alert module, arrival of the train entering the railway yard to railway workers and administration via the wireless mesh communication network in response to the one or more of the train detection modules detecting the direction of travel indicating the train is entering into the railyard and the at least one personal alert module is in proximity thereto.

14. The method of claim 13, further comprising: reporting when the train entering the railyard diverts onto one of a plurality of connecting railways between entry and exit tracks to the railyard via the wireless mesh communication network.

15. The method of claim 13, further comprising: utilizing multiple different means of wireless communication for reporting arrival of the train to railway workers and administration via the wireless mesh communication network.

16. The method of claim 15, wherein the means of wireless communication comprises at least one of an XBEE module, ZigBee, Bluetooth classical, Bluetooth low energy, Wi-Fi, universal software radio peripheral, software-defined radio, 5G network, 900 MHz radio band, 2.4 GHz radio band, or 5 GHz radio band.

17. The method of claim 13, further comprising: sensing the location and direction of the train relative to one or more of the train detection modules.

18. The method of any of claim 13, further comprising: alerting one or more users of the personal alert modules of the arrival of a train to the railyard.

19. The method of claim 18, further comprising: utilizing at least one of a siren or a strobe light for alerting one or more users of the personal alert modules of the arrival of a train to the railyard.

20. The method of claim 18, further comprising generating, by one or more of personal alert modules, an alarm using at least one of a visual feedback, a haptic feedback, or an audio feedback.

* * * * *